March 19, 1963 A. J. RADCLIFFE, JR 3,082,297
TELEPHONE LINE CIRCUIT
Filed Aug. 2, 1956
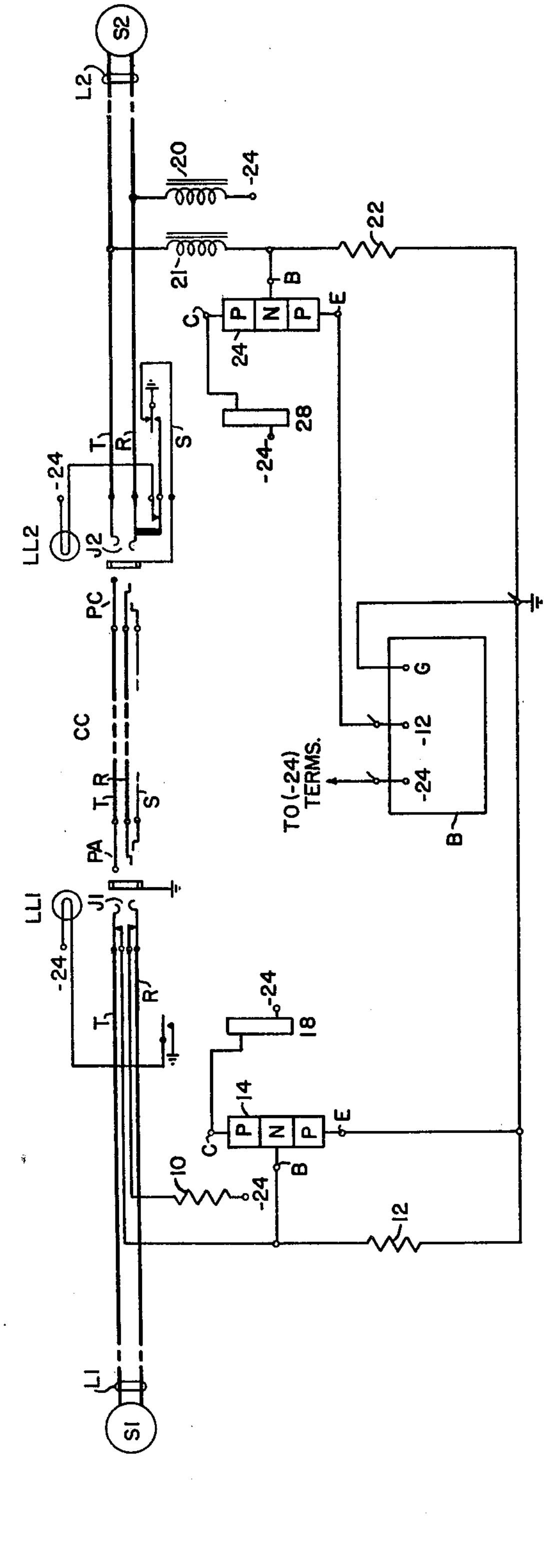

United States Patent Office 3,082,297

Patented Mar. 19, 1963

3,082,297

TELEPHONE LINE CIRCUIT

Arthur J. Radcliffe, Jr., La Grange, Ill., assignor to International Telephone and Telegraph Corporation, New York, N.Y., a corporation of Maryland Filed Aug. 2, 1956, Ser. No. 601,721
5 Claims. (Cl. 179—76)

This invention relates to a telephone line circuit, and more particularly to a line circuit employing a transistor for detecting a calling condition. Its principal object is to provide a line circuit which is lightweight and has low power consumption, for use in a portable field switchboard. A further object is to provide a line circuit capable of detecting a relatively small difference between the value of signal current on open lines having low leakage resistance and on closed lines having high line resistance.

In portable switchboards such as those for military field use, it is desirable that the weight be kept to a minimum. A common battery with connections to the normally open individual lines may be used for signalling, in which case closure of a line at a telephone station imparts a calling-condition signal to the switchboard. The common battery comprises small primary cells; therefore the current drain should be kept low. A line relay could be connected in the signalling circuit of each line to detect a calling condition; but such relays of the usual type are somewhat heavy for use in portable equipment, and may draw substantial current, even when the line is open, because of leakage current between the line conductors. In addition, if the difference between the lowest leakage resistance between conductors on an open line, and the highest resistance of a closed line is relatively small, the marginal operation required may be difficult to obtain. Small, lightweight relays are available, but they are not sensitive enough and do not meet the marginal operating requirement for use with direct connections to the line, especially if the battery drain is to be kept low.

Vacuum tubes may be used in the call-detecting circuit, but they require a substantial amount of power for heating the cathode or filament, and have a limited life. It has been proposed to use transistors, but in prior arrangements the signalling current which leaks to ground, as well as that between the line conductors, flows through the input circuit of the transistor, increasing the possibility of false operation.

According to the invention, the signal circuit for each line extends to the line from a free pole of the battery, and is returned to ground through a resistor and the control electrodes of a transistor in parallel, the control electrodes, or the detector portion, of a transistor comprising the emitter and base electrodes thereof. With this arrangement, leakage to ground is completely shunted from the detecting portion of the circuit, and the resistor reduces the sensitivity to leakage between the line conductors. A miniature relay may be operated in the collector circuit of the transistor.

According to a further feature of the invention, the aforementioned control electrodes are connected reversely between the ungrounded end of the resistor and a pole of intermediate potential, so that signal current does not flow in the transistor until the voltage drop across the resistor reaches a given value. Thereby, leakage current may be shunted to ground, while signal current above a given value flows through the transistor to cause operation of the signal device when the line is closed. In the preferred form, the base terminal of the transistor is connected to the resistor and the emitter terminal is connected to the pole of intermediate potential.

The foregoing and other objects and features of this invention and the manner of attaining them will become more apparent and the invention itself will be best understood, by reference to the following description of an embodiment of the invention taken in conjunction with the accompanying drawing.

Referring now to the drawing, the invention is disclosed as applied to a manual telephone system, such as the type using portable equipment for military field use. The switchboard includes cord circuits such as CC for extending connections between lines such as L1 and L2 having respective stations S1 and S2. A common battery B is used for signalling.

A signal circuit for line L1 extends from the negative 24-volt terminal of battery B, through resistor 10 and contacts of jack J1 to conductor R of the line, and is returned from conductor T through contacts of jack J1, to the base terminal of a PNP junction transistor 14, thence through the emitter electrode of the latter to the grounded pole of the battery. A resistor 12 is connected between the transistor base electrode B and ground. Negative 24-volt bias is applied to the collector terminal through the operating element of relay 18.

With the line open some current flows in the signal circuit through resistor 10 and the leakage resistance between the conductors of the line, and divides between the parallel paths through the emitter and base electrodes of transistor 14 and resistor 12. The current flowing through the emitter and base electrodes of transistor 14 causes some current to flow in the collector circuit through the operating element of relay 18. Resistors 10 and 12 are provided with such resistance values as to keep this current to a low value. The power requirements of the operating element of relay 18 and the relative resistances of resistor 12 and the base and emitter electrodes of the transistor 14 are such that relay 18 does not operate, even on lines with low but normal leakage resistance. Current may flow through resistor 10 and a leakage path from the line conductors to ground, but this current bypasses resistor 12 and the transistor.

When a call is made from station S1 the line is closed and the signal current is increased by the flow over the line conductors. The current flowing through the emitter and base electrodes of transistor 14 causes the current through the collector circuit to increase. Relay 18 operates and at its contacts closes a circuit to light the line lamp LL1. The operator, observing the lighted lamp, may insert the plug PA of cord circuit CC into jack J1. The signal circuit is opened at the contacts of jack J1, thereby releasing relay 18 and opening the circuit to extinguish the line lamp LL1. If the desired party is at station S2, the operator may then insert the plug PC into the jack J2 of the desired line L2, and signal station S2.

Alternative features of the invention are shown in the signal circuit for line L2. The signal circuit is shown connected permanently to the line, instead of being cut off when a plug is inserted into jack J2. Therefore inductors 20 and 21 are used to obtain minimum loss to voice currents. These may be miniature inductors having an inductance of 5 henries each and a resistance of 2000 ohms each. Inductor 20 is connected from the 24-volt negative terminal of battery B to conductor R, and inductor 21 is connected from conductor T to the base electrode of a PNP junction transistor 24.

A resistor 22 and the emitter electrode of transistor 24 are connected in parallel between the base electrode and ground. However, according to a further feature of the invention, the emitter electrode is connected to a point of intermediate potential, shown as the negative 12-volt terminal of battery B. With this arrangement the control electrodes of transistor 24, that is, the emitter and base electrodes thereof, are biased in the reverse direction and therefore current flow in the transistor is substantially blocked, until the potential at the base terminal reaches a value sufficient to overcome this reverse bias. Resistor 22 may have a value of 6000 ohms. Negative 24-volt bias is applied to the collector electrode of transistor 24 through the operating element relay 28. The normal leakage current will not cause a sufficient voltage drop across resistor 22 to lower the base electrode to a potential which overcomes the reverse bias, therefore no transistor current flows. Leakage current from the line conductors to ground by-passes resistor 22 and transistor 24.

When a call is made from station S2 and the line L2 is closed, the signal current increases. The current through resistor 22 increases until the potential at the base terminal reaches a value which causes transistor current to flow. Because of the small value of internal resistance between the emitter and base electrodes of the transistor 24 compared to the value of resistor 22, substantially all current above this value flows through the emitter electrode of the transistor. Current in the collector circuit reaches saturation. With transistors such as type 2N43A, the collector current may be as much as forty times the input current to the base electrode. Relay 28 operates, and at its make contacts extends ground through contacts on jack J2 to light the line lamp LL2 from the 24-volt negative battery terminal. The operator, observing the lighted lamp, may insert the plug PA into jack J2. The lamp LL2 is extinguished by opening its circuit at contacts of jack J2. If the desired party is at station S1, the operator may then insert the plug PC into the jack J1 of the desired line L1, and signal the station S1 thereon.

With the signal circuit shown for line L2, under most conditions, the transistor is at cutoff or saturation, and therefore the power dissipation in the transistor is low. Also, the current flow through the relay is normally substantially zero when the line is open, and full value when the line is closed. The relay 28 may be of miniature construction, such as one available type having a weight of 0.035 ounce, a resistance of 2000 ohms, and requiring 100 milliwatts to operate.

The cord circuit CC includes supervisory and control arrangements which partly depend upon ground on the sleeve conductor S for operation. With a line circuit such as shown for line L1, ground is extended through the sleeve of the jack and plug whenever one of the plugs is inserted. A circuit is shown for line L2 in which the ground is supplied to the sleeve through break contacts of relay 28, and is therefore extended to the cord circuit only when a plug is inserted and the line L2 is open. While the two line circuits are shown in the same system for purpose of illustration, it should be understood that it is preferable to use one method, and to equip the cord circuit CC accordingly.

The operator, upon receiving supervision indicating that the parties have hung up and the call is ended, may remove the plugs from the jacks to return the lines to normal.

While I have described above the principles of my invention in connection with specific apparatus, it is to be clearly understood that this description is made only by way of example and not as a limitation to the scope of my invention.

I claim:

1. In a telephone system, a switchboard having signalling devices, a plurality of two conductor lines terminating at said switchboard, means for selectively closing and opening a loop circuit including said lines to operate said signalling devices; control means for each of said lines responsive to closure of said loop to operate the corresponding signalling device, said control means comprising a direct current power supply source having at least two sides, an electro-responsive device for controlling the corresponding signalling device at said switchboard, a transistor having an emitter electrode and a collector electrode and a base electrode, said electroresponsive device being connected in series with said emitter and collector electrodes for energization from said source under the control of said transistor, a voltage drop device connected between said base electrode and a first of the sides of said source and signalling circuit means comprising said loop closing and opening means for connecting said voltage drop device to the other side of said source, said voltage drop device being responsive to closure of said line to render said transistor conductive thereby to energize said electroresponsive device; means responsive to energization of said electroresponsive device for operating the corresponding signalling device at said switchboard, and means effective in response to establishment of a connection between said line conductors and said switchboard for preventing loss of voice frequency currents to said signalling circuit means.

2. The invention defined in claim 1 together with bias voltage means comprising said power supply source for normally maintaining said transistor non-conducting when said loop is open.

3. The invention defined in claim 2, wherein said bias voltage means comprises connection of said emitter electrode to one side of said source and connection of said base electrode through said voltage drop device to said one side of said source.

4. The invention defined in claim 2, wherein said bias voltage means comprises connection of said base electrode through said voltage drop device to one side of said source and connection of said emitter electrode to a terminal on said source having a voltage intermediate the voltages of said two sides.

5. The invention defined in claim 1, wherein the last mentioned means comprises a first inductor connected between one side of said source and one conductor of said line, and a second inductor connected between the other conductor of said line and said voltage drop device, said first and second inductors effectively preventing voice-frequency currents from flowing through said signalling circuit means and for confining such voice-frequency currents to said two conductor line.

References Cited in the file of this patent

UNITED STATES PATENTS

| | | |
|---|---|---|
| 2,066,502 | Whitney | Jan. 5, 1937 |
| 2,435,302 | Young | Feb. 3, 1948 |
| 2,547,386 | Gray | Apr. 3, 1951 |
| 2,785,229 | Faulkner | Mar. 12, 1957 |
| 2,829,203 | Pitlick | Apr. 1, 1958 |
| 2,835,740 | Heetman | May 20, 1958 |